United States Patent
Milman et al.

(10) Patent No.: US 9,455,976 B2
(45) Date of Patent: Sep. 27, 2016

(54) MULTI-FACTOR SECURE APPLIANCE DECOMMISSIONING

(71) Applicant: GLOBALFOUNDRIES INC., Grand Cayman (KY)

(72) Inventors: Ivan Matthew Milman, Austin, TX (US); Ronald Dwayne Martin, Round Rock, TX (US); Kalpesh Hira, Austin, TX (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 90 days.

(21) Appl. No.: 14/294,219

(22) Filed: Jun. 3, 2014

(65) Prior Publication Data
US 2015/0350175 A1    Dec. 3, 2015

(51) Int. Cl.
*H04L 29/06* (2006.01)
*H04L 29/08* (2006.01)
*G06F 9/455* (2006.01)

(52) U.S. Cl.
CPC ............ *H04L 63/08* (2013.01); *H04L 63/0846* (2013.01); *H04L 67/10* (2013.01); *H04L 67/42* (2013.01); *G06F 2009/45562* (2013.01); *G06F 2221/2143* (2013.01)

(58) Field of Classification Search
CPC ....... H04L 63/08; H04L 63/06; H04L 67/10; H04L 67/42; G06F 2009/455562; G06F 2221/2143
See application file for complete search history.

(56) References Cited

U.S. PATENT DOCUMENTS

| | | | | |
|---|---|---|---|---|
| 5,513,319 | A * | 4/1996 | Finch ................. | G06F 11/0757 714/55 |
| 7,007,077 | B1 * | 2/2006 | Shinohara ................. | G06F 8/60 709/220 |
| 7,971,241 | B2 * | 6/2011 | Guyot ..................... | G06F 21/80 380/279 |
| 8,378,826 | B2 * | 2/2013 | Mercier ................. | G06Q 10/08 340/572.1 |

(Continued)

FOREIGN PATENT DOCUMENTS

WO    WO2013070812    5/2013

OTHER PUBLICATIONS

Buecker et al, "Understanding IT Perimeter Security," 2008.
(Continued)

*Primary Examiner* — Jung Kim
*Assistant Examiner* — James J Wilcox
(74) *Attorney, Agent, or Firm* — DeLio, Peterson & Curcio, LLC; Kelly M. Nowak (57) ABSTRACT

A network-based appliance includes a mechanism to erase data on the appliance's local storage. The appliance's normal system reset operation is overridden to enable a local user to place the appliance into a safe mode during which remote erasure of the storage is permitted, provided that mode is entered within a first time period following initiation of a system reset. If the appliance is placed in the mode within the time period, it can then receive commands to wipe the local storage. Once the safe mode is entered by detecting one or more actions of a local user, preferably the appliance data itself is wiped by another person or entity that is remote from the device. Thus, physical (local) presence to the appliance is necessary to place the device in the safe mode, while non-physical (remote) presence with respect to the appliance enables actual wiping of the storage device.

18 Claims, 3 Drawing Sheets

(56) References Cited

U.S. PATENT DOCUMENTS

| | | | |
|---|---|---|---|
| 8,429,420 B1* | 4/2013 | Melvin | G06F 21/79 711/163 |
| 8,601,472 B1* | 12/2013 | LeMahieu | G06F 9/48 718/1 |
| 8,799,915 B1* | 8/2014 | LeMahieu | G06F 9/5022 709/226 |
| 2006/0041749 A1* | 2/2006 | Ptasinki | H04W 12/06 713/168 |
| 2007/0233636 A1* | 10/2007 | Kato | G06F 21/608 |
| 2008/0172744 A1 | 7/2008 | Schmidt et al. | |
| 2009/0070574 A1* | 3/2009 | Rothman | G06F 11/0748 713/2 |
| 2013/0084846 A1 | 4/2013 | Walker et al. | |
| 2013/0167247 A1 | 6/2013 | Brown et al. | |
| 2014/0025947 A1* | 1/2014 | Jaber | G06F 21/572 713/164 |
| 2014/0115148 A1* | 4/2014 | Abuelsaad | H04L 43/0817 709/224 |
| 2014/0115371 A1* | 4/2014 | Abuelsaad | H04L 43/0817 713/340 |
| 2014/0115709 A1* | 4/2014 | Gross | G06F 21/62 726/26 |
| 2015/0121537 A1* | 4/2015 | Ellis | G06F 21/60 726/26 |
| 2015/0379284 A1* | 12/2015 | Stuntebeck | G06F 21/62 726/30 |
| 2016/0098335 A1* | 4/2016 | Sleator | G06F 13/409 710/16 |
| 2016/0127327 A1* | 5/2016 | Mehta | H04L 63/0428 713/168 |

OTHER PUBLICATIONS

Buecker et al, "Stopping Internet Threats Before They Affect Your Business by Using the IBM Security Network Intrusion Prevention System," 2011.

\* cited by examiner

MULTI-FACTOR SECURE APPLIANCE DECOMMISSIONING

BACKGROUND OF THE INVENTION

1. Technical Field

This disclosure relates generally to information security on network-connected appliances.

2. Background of the Related Art

Network-connected, non-display devices ("appliances") are ubiquitous in many computing environments.

For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and lightweight middleware stacks can address the performance burden experienced by conventional software solutions. In addition, the appliance form-factor provides a secure, consumable packaging for implementing middleware SOA functions. One particular advantage that these types of devices provide is to offload processing from back-end systems. To this end, it is well-known to use such middleware devices to perform computationally-expensive processes related to security.

Another common use for appliances is network security. For example, network intrusion prevention system (IPS) appliances are designed to sit at the entry points to an enterprise network to protect business-critical assets, such as internal networks, servers, endpoints and applications, from malicious threats.

Other appliance-based solutions are common in cloud compute environments. Cloud compute resources are typically housed in large server farms that run networked applications, typically using a virtualized architecture wherein applications run inside virtual servers, or so-called "virtual machines" that are mapped onto physical servers in a data center facility. Appliances are often used in these types of environments to facilitate rapid adoption and deployment of cloud-based offerings. Typically, the appliance is positioned directly between the business workloads that many organizations use and the underlying cloud infrastructure and platform components.

While enterprise appliances of these types are quite varied and provide numerous advantages, they often need to be decommissioned for various reasons, e.g. to enable servicing, because a lease on the device expires, to facilitate an upgrade to new hardware, because the device is sold, or the like. Appliances scheduled for decommissioning, however, often have sensitive data on them. Thus, for example, an appliance provisioned to facilitate health care-related functions may store HIPAA-regulated data. An appliance scheduled to be decommissioned may be stolen or otherwise accessed by unauthorized persons prior to its decommissioning, the sensitive data stored on the device is at risk. One obvious solution to this security concern is to wipe the contents of the appliance's drive. This is easier said than done. Because secure appliances of this type typically do not have keyboards, displays, CD drives or often even USB-based ports, there is no convenient way to boot a disk that might wipe the internal drive prior to or in association with the decommission. An alternative is to enable a remote wipe of the appliance, e.g., by a privileged remote administrator. That solution, however, raises another security risk, namely, how to prevent malicious or accidental wipes (even from such a privileged administrator).

There remains a need to ensure protection of sensitive data on an appliance that is being decommissioned (or otherwise taken out of service) and, in particular, when the appliance is being managed from a remote location.

BRIEF SUMMARY

According to this disclosure, a network-based appliance includes a mechanism to enable secure erasure of sensitive data on the appliance's local storage, e.g., prior to appliance decommissioning. In one embodiment, the appliance's normal system reset operation is augmented (or overridden) to selectively enable a local user to place the appliance into an operating (or "safe") mode during which remote erasure of the local storage is permitted, provided that mode is entered within a first time period following initiation of a system reset. If the appliance is placed in the mode within the first time period, it can then receive appropriate commands to wipe the local storage. Thus, once the safe mode is entered by detecting one or more actions of a local user, preferably the appliance data itself is wiped by another person or entity that is remote from the device. Typically, the person is a remote privileged administrator that is assumed to have the authority and capability to formally "wipe" the appliance, but only while the appliance has been first placed into the safe mode. Thus, preferably physical (local) presence to the appliance is necessary to place the device in the safe mode, while non-physical (remote) presence with respect to the appliance is the state during which actually wiping of the storage device occurs. This implements a "multi-factor" decommissioning operation, namely, a local operation (typically by a first person or entity) to place the appliance in the proper safe mode, with a remote operation (typically by a second person or entity) then being initiated to perform the erasure itself.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
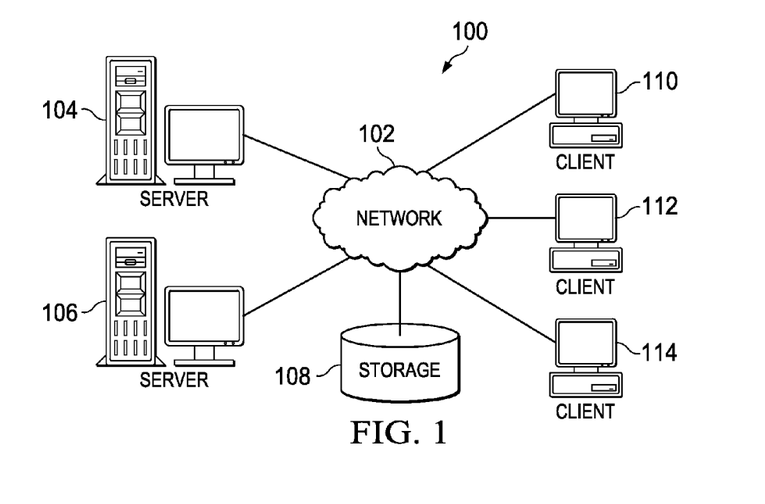
FIG. 1 depicts an exemplary block diagram of a distributed data processing environment in which exemplary aspects of the illustrative embodiments may be implemented.
Figure 2:
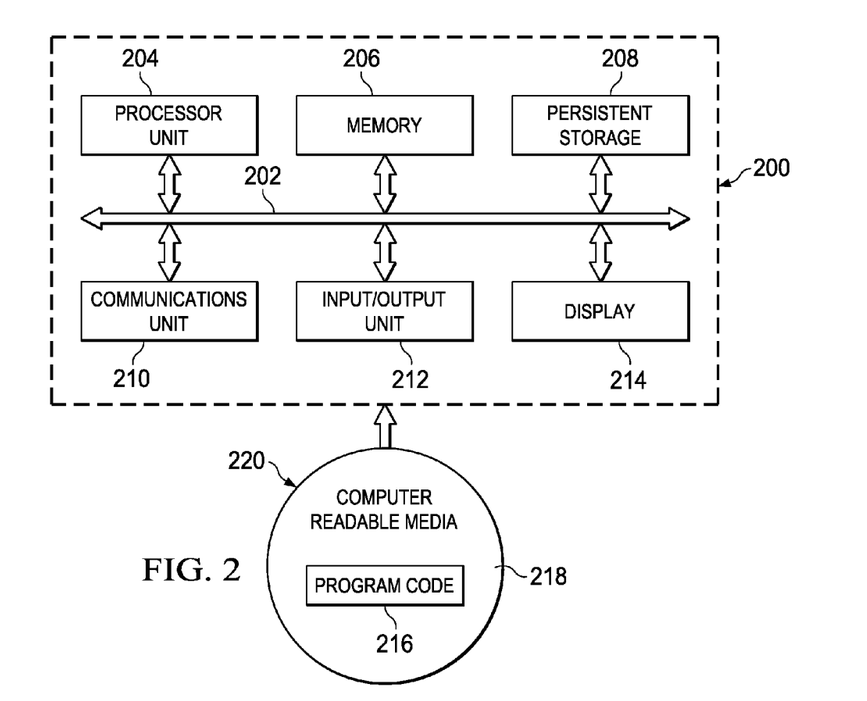
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding TTP and XML is available from Internet Engineering Task Force (IETF). Familiarity with these standards is presumed.

Network-Connected, Non-Display Secure Appliances

The secure nature of the physical appliance (sometimes referred to herein as a box) typically is provided by a self-disabling switch, which is triggered if the appliance cover is removed. This physical security enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within private or on-premise cloud computing environments. The appliance may include hardware and firmware cryptographic support, possibly to encrypt data on hard disk. No users, including administrative users, can access any data on physical disk. In particular, preferably the operating system (e.g., Linux) locks down the root account and does not provide a command shell, and the user does not have file system access. Typically, the appliance does not include a display device, a CD or other optical drive, or any USB, Firewire or other ports to enable devices to be connected thereto. It is designed to be a sealed and secure environment with limited accessibility and then only be authenticated and authorized individuals.

Figure 3:
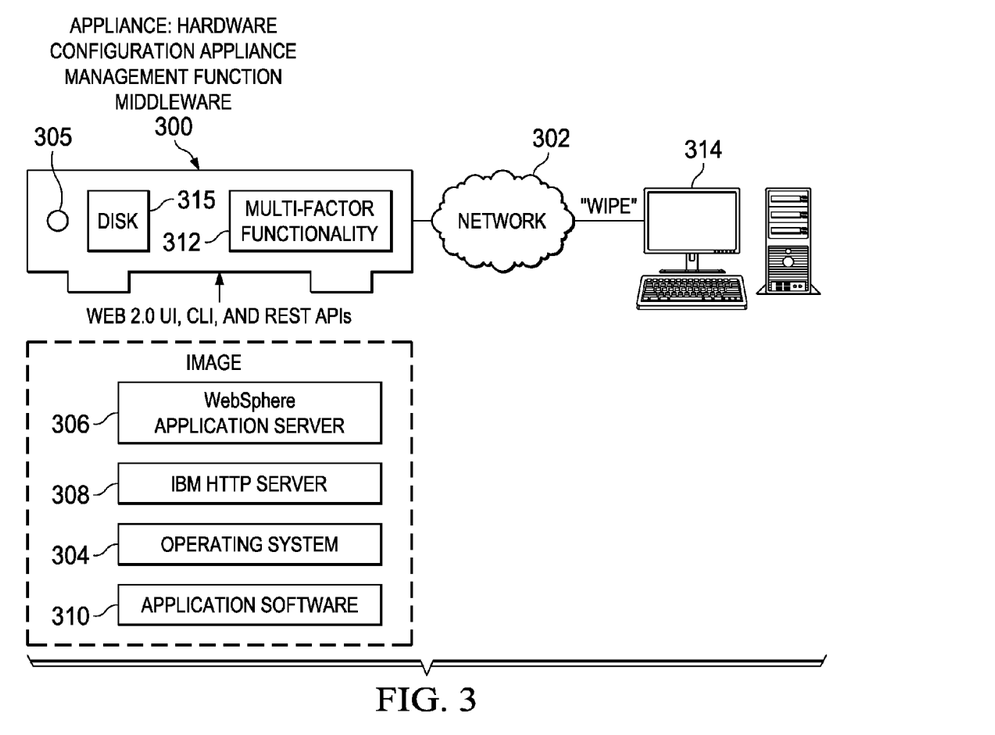
FIG. 3 illustrates an exemplary network-based secure appliance in which the disclosed subject matter may be implemented.

Referring to FIG. 3, a representative operating environment includes the physical appliance 300, which interfaces to a network 302. The appliance may be implemented using a data processing system such as described above with respect to FIG. 2, and it may represent one of the servers (or clients) shown in FIG. 1. Preferably, the appliance 300 includes a Web 2.0-based user interface (UI), a command line interface (CLI), and REST-based application programming interfaces (APIs). In this example, the appliance has been provisioned with an image comprising an operating system 304, an application server 306, an HTTP server 308, and other application programs 310. Additional software solutions (not shown) may be included within the image. These software elements may come pre-loaded on the appliance, which may include other data (e.g., templates, scripts, files, etc.). The particular software configuration of course will depend on the use being made of the appliance. The appliance includes one or more storage devices (e.g., disk 315). The type and number of storage devices may vary.

The appliance also includes a button 305, such as a system reset. According to this disclosure, the appliance's normal system reset functionality is augmented to include a "multi-factor" decommissioning functionality, which is illustrated as a software-based component 312. As will be described, this functionality selectively controls the appliance so that it may be placed in a mode by which a user at a remote system 314 may "wipe" the storage device 315. This process is now described.

Multi-Factor Secure Appliance Decommissioning

Without limitation, the subject matter may be implemented in any network-connected secure appliance irrespective of how that appliance is being used (e.g., SOA-support, network security, cloud application deployment, etc.).

In general, a network-based appliance includes a mechanism to enable secure erasure of sensitive data on the appliance's local storage, preferably prior to decommissioning. In one embodiment, the appliance's normal system reset operation is augmented (or overridden) to selectively enable a local user to place the appliance into an operating (or "safe") mode during which remote erasure of the local storage is permitted, provided that mode is entered within a first time period following initiation of a system reset. If the appliance is placed in the mode within the first time period, it can then receive appropriate commands to wipe the local storage. Thus, once the safe mode is entered by detecting one or more actions of a local user, preferably the appliance data itself is wiped by another person or entity that is remote from the device. Typically, the person is a remote privileged administrator that is assumed to have the authority and capability to formally "wipe" the appliance, but only while the appliance has been first placed into the safe mode. Thus, preferably physical (local) presence to the appliance is necessary to place the device in the safe mode, while non-physical (remote) presence with respect to the appliance is the state during which actually wiping of the storage device occurs. This implements a "multi-factor" decommissioning operation, namely, a local operation (typically by a first person or entity) to place the appliance in the proper safe mode, with a remote operation (typically by a second person or entity) then being initiated to perform the erasure itself.

Preferably, the approach described herein is to create a button-based "wipe command" that can be carried out through standard appliance management. Preferably, and with reference to FIG. 3, this is achieved by including the button 305 on the appliance (or to use an existing button whose function has been modified hereby) to place the appliance into a state, but only for a limited time period, that allows its internal drive 315 to be wiped. As used herein, a "wipe" (or "erasure") is assumed to erase all of the writeable file systems within the appliance directly, or to cause a boot of a dedicated kernel (not shown) that itself wipes those file systems. A state in which the appliance's data can be erased is sometimes referred to herein as a "safe mode." Because the button 305 puts the appliance into the state that is enabled for wipe, it may also be considered a "wipe/safe mode-enabled" button. This nomenclature is not intended to be limiting. The button 305 used for secure decommissioning according to this disclosure can be a button dedicated to this function or simply the existing system reset (or other) appliance button whose operation is modified according to the techniques herein. A physical button is not a requirement either, as the technique may be used with any physical switch, e.g., a knob, a selector, etc.

Figure 4:
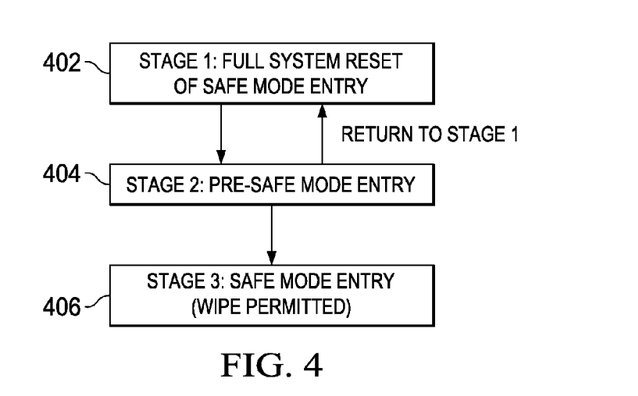
FIG. 4 illustrates a multi-stage operation by which the appliance may be placed in a safe mode to permit remote wiping by augmenting a system reset button function.

FIG. 4 is a process flow that illustrates how a special sequencing is applied to the button to initiate the secure appliance decommissioning operation of this disclosure. This is a local action. To this end, the button sequence preferably includes three (3) ordered stages as follows: stage 1 (402), which is a full system reset or safe mode entry; stage 2 (404), a pre-safe mode entry; and stage 3 (404), safe mode entry. The wipe occurs in stage 3. Stage 2 is an intermediary stage with the ability either to go back to stage 1 (in an abort), or to proceed to stage 3. To enter safe mode, preferably the button 305 is asserted (held) for a given time (e.g., 3-5 seconds) allowing the device to start a full system reset (which is a conventional operation, and which typically is indicated by a beep). According to this disclosure, however, this operation is modified to initiate a watchdog timer that functions in effect to inhibit the system reset while it is counting down. The timer is implemented within the multi-factor functionality 312 in FIG. 3. The timer starts counting down (upon initiation of the full system reset) for a given first time period (e.g., 60 seconds, which time is configurable). The watching timer gates a full system reset from occurring until it has finally counted down. If safe mode is entered at any point during the first time period, the timer does not fully count down and a system reset does not occur. To this end, preferably the user takes another given action, such as pressing the button an additional number of times (e.g., twice), to enter the safe mode (stage 3); if the user only presses the button a single time, however, the system returns (from stage 2) back to stage 1. Preferably, a beep indicates a successful transition (from stage 1→stage 2→stage 3) to the safe mode after each step. The watching timer is interrupted from fully counting down by receipt of both interrupts at each assertion of the button.

Thus, safe mode is entered by detection of a local action on the appliance itself. Once in safe mode (stage 3), the watchdog timer resets itself to a second time period and starts counting down again. Typically, the second time period is longer than the first time period. For example, the second time period (which itself preferably is configurable) is ten (10) minutes, although any period may be used. If, during the safe mode of operation, the watching timer then counts down and expires, i.e., the timer is not again interrupted, the appliance is finally reset. Thus, upon initial system reset, the watchdog timer begins a first (e.g., 1 minute) countdown; system reset is inhibited during the first time period to enable the user to enter the safe mode. If safe mode is entered, the watchdog timer begins a second (e.g., 10 minute) countdown. The watchdog timer preferably is implemented in software and may be two (2) separate timers.

As noted, the button operations described above are a "local" action because they take place (if at all) at the device itself. Once safe mode is entered, preferably the appliance data itself is wiped by another person or entity that is remote from the device. This is a remote action. Typically, the person is a remote privileged administrator. The remote privileged administrator may be a human being, or a computing entity controlled or managed by such a person. The remote administrator is assumed to have the authority and capability to formally "wipe" or "erase" the appliance, but only while the appliance has been placed into the safe mode in the manner previously described. Thus, physical (local) presence to the appliance is necessary to place the device in safe mode, while non-physical (remote) presence with respect to the appliance is the state during which actually wiping of the storage device occurs. Thus, a "multi-factor" decommissioning operation (one, a local operation to place the appliance in the proper safe mode, the other remote to perform the erasure) provides significant advantages.

The second or remote operation (or set of operations) is now described. These operations comprise an authorized remote request to erase at least one storage device within the secure appliance, thereby wiping all data from that storage device. There may be multiple storage devices within the appliance, and the authorized remote request may serve to wipe all (or some) of these storage devices. There may be an authorized remote request to erase for each storage device within the appliance. Preferably, a single (global) request to wipe all storage devices is used.

When safe mode is entered, preferably the authorized remote request itself is enabled in phases. First, preferably the remote user must enter a first code corresponding to a hardware-based key on the appliance. For example, when the appliance is manufactured, a storage controller (or other) chip on the device may be programmed via an ECID (Electronic Chip Identification) fuse blown pattern. The hardware key would then be known only to the manufacturer and purchaser of the chip (and the appliance). If the remote user can enter the first code, a match on the hardware key then allows that user to take a second required action, e.g., entry of a particular command that enables a bit in a hardware register so that the actual wipe mechanism can function. Once the second action (and there may be other requirements) completes, the remote user can finally enter a pre-programmed software code to perform the actual storage device wipe. While the pre-programmed software code might be more publicly-known (and thus less secure), presumably the hardware keys and bit setting operation are much less publicly-known (and thus very secure). Together, these operations (or at least some of them) comprise the authorized remote request. After the pre-programmed software code is received, an interrupt is sent to the watchdog time, once again freezing the countdown. This allows the wipe to taken place. Once the wipe is finished, preferably the countdown is resumed (e.g., by another interrupt) and the system eventually resets.

Figure 5:
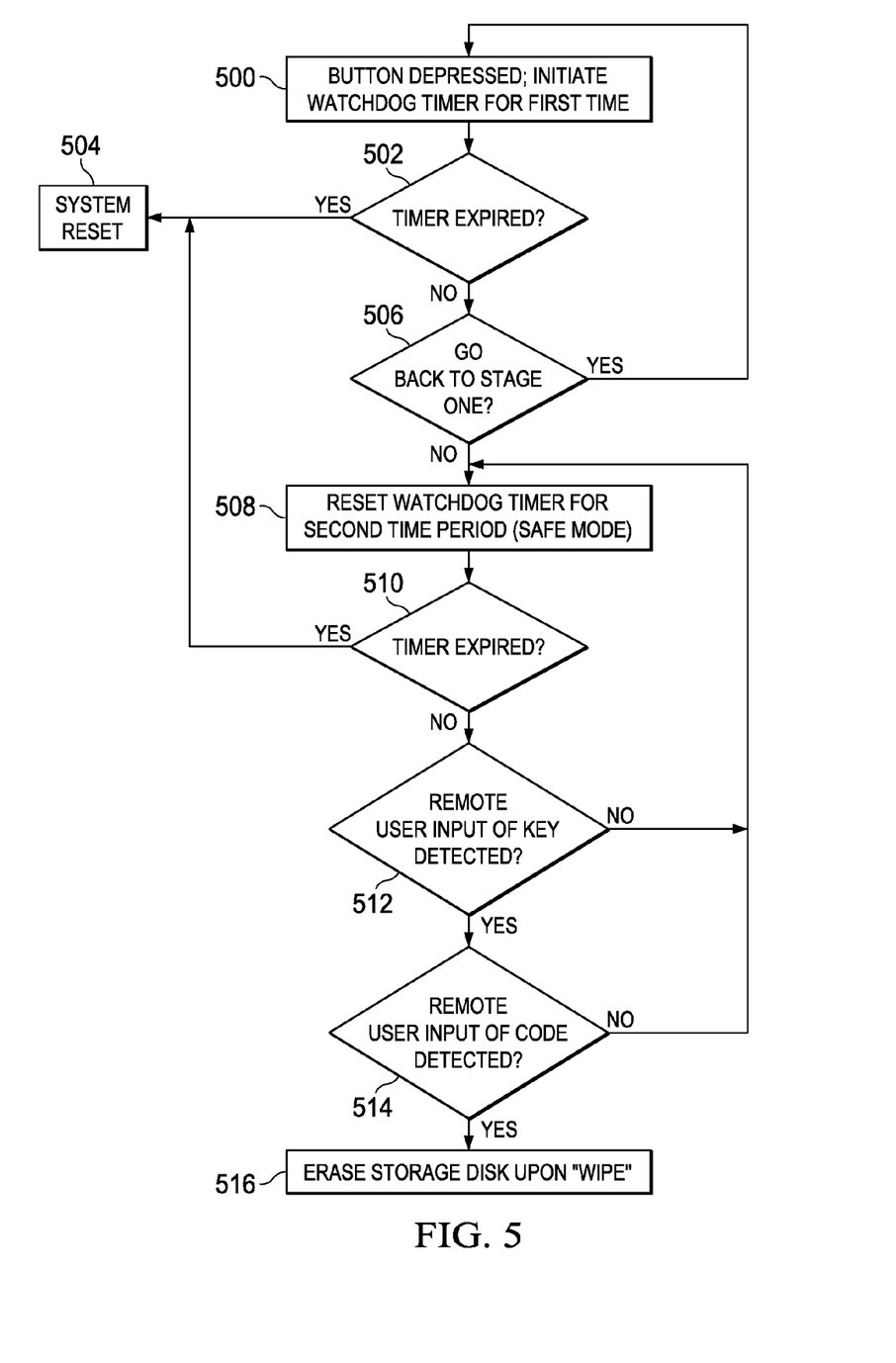
FIG. 5 is a process flow illustrating a preferred multi-factor appliance decommissioning function according to this disclosure.

FIG. 5 is a process flow representing the overall multi-factor operation in one embodiment. The routine begins at step 500 when the button is depressed by a user local to the appliance. This initiates the watchdog timer, which begins a first countdown (lasting for the first time period). A test is then performed at step 502 to determine whether the timer has expired. If so, the system resets at step 504. If the outcome of the test at step 502 indicates that the watchdog timer has not expired (and thus has been interrupted), a test is then performed at step 506 to determine whether the local user has placed the appliance back into its pre-reset state (by moving back to stage 1). If the outcome of the test at step 506 is negative, then the local user has transitioned to stage 3, which is the safe mode. At step 508, the watchdog timer is reset and begins a second countdown (lasting for the second time period). A test is then performed at step 510 to determine whether the watchdog timer has expired. If so, control is returned to step 504 and the system resets. If, however, the outcome of the test at step 510 indicates that the watchdog timer has not expired (and once again has been interrupted), the routine continues. At step 512, a test is performed to determine whether the system can detect remote user input of a hardware key assigned to some hardware element in the appliance. If the outcome of the test at step 512 is positive, the routine then performs a test at step 514 to determine whether the system can detect remote user input of a software code assigned to the appliance. If and only if the outcome of the test at step 514 is then positive, the system is then placed in an operating mode by which it can receive remote entry of a wipe command. If the outcome of either test 512 or test 514 fails, the second countdown is re-started. Upon permitted receipt of the wipe command, the local disk (or other data store) is erased at step 516 to complete the process.

The above-described subject matter provides many advantages. By requiring a multi-factor operation as described, interested entities can be assured that the sensitive data on the appliance (whether stored encrypted or in the clear) is securely wiped from the appliance prior to or in connection with decommissioning. The approach ensures that only an appropriate person or entity can perform the actual wipe, but the requirement of the local action (to initiate) the overall process ensures against accidental or malicious wipes from even a privileged remote administrator. The approach is safe, reliable, and simple to implement in association with existing device reset functions.

There is no requirement that the multi-factor functionality be implemented from a system reset, although this is a preferred operation. The functionality may be implemented as a standalone operation with its own dedicated button. As noted, the particular local activation mechanism itself may be quite varied and is not limited to a physical button.

While a preferred operating environment and use case (a secure appliance) has been described, the techniques herein may be used in any other operating environment in which it is desired to decommissioning (or otherwise remove from service) a computing system or device and for which it is desired to ensure protection of the data that might be stored thereon.

As has been described, the functionality described above may be implemented as a standalone approach, e.g., a software-based function executed by a processor, or it may be available as a service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

As explained, the scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the interfaces and utility are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

While the technique herein is described in the context of a decommissioning operation, this is not a limitation, as the techniques may be used whenever it is necessary or desirable to wipe an appliance data store.

The appliance is not limited to any particular type of appliance. The multi-factor operation may likewise be used to erase data from any machine, irrespective of the machine's physical configuration.

The technique herein may be extended (beyond the "wipe" use case) to invoke any privileged operation (by way of a privileged command). As one of ordinary skill will appreciate, a goal of the described method is to identify correctly the appliance to be operated upon using both physical and remote pathways, so that the privileged operation (initiated by the privileged command) cannot be invoked accidentally or maliciously either by the remote operator or the physical operator acting independently. In addition to the "wipe" privileged command, other privileged commands including, without limitation, as "modify firmware" or "replace operating system," etc., may use the approach. Thus, and generalizing, the multi-factor security approach of this disclosure may be applied to invoke any privileged operation (using a privileged command) where, by virtue of its function, the privileged operation might present a security risk or otherwise be dangerous to the integrity of the appliance.

Having described our invention, what we now claim is as follows:

1. An apparatus, comprising:
a processor;
computer memory holding computer program instructions executed by the processor to invoke a privileged operation within a network-connected appliance using a privileged command, the network-connected appliance having a normal system reset and a local storage, the computer program instructions comprising:
program code responsive to detecting, during a first time period, of a local action on the appliance, to initiate a second time period and to transition the appliance into a state that overrides the normal system reset and places the network-connected appliance into a safe mode in which invocation of the privileged operation is allowed for remote erasure of the network-connected appliance local storage, wherein the local action is receipt of a button press on the appliance to place the application in the safe mode during which remote erasure of the local storage is permitted remote from the appliance; and
program code responsive to detecting, prior to expiration of the second time period, of an authorized remote request, to initiate the privileged command and enable remote erasure of sensitive data on the network-connected appliance local storage prior to decommissioning the network-connected appliance, the program code response to detecting the authorized remote request including program code to detect remote entry of a key uniquely assigned to a hardware element in the device and program code responsive to detection of the remote entry of the key, to interrupt the second time period to allow initiating the privileged command.

2. The apparatus as described in claim 1 wherein the privileged command is a wipe command to securely erase storage device in the network-connected appliance.

3. The apparatus as described in claim 1 wherein the local action is receipt of the button press on the appliance by a local user to place the application in the safe mode during which remote erasure of the local storage is permitted by another user that is remote from the appliance.

4. The apparatus as described in claim 3 wherein the first time period is initiated upon detecting a system reset command.

5. The apparatus as described in claim 1 further including: program code to detect remote entry of a code uniquely assigned to a software element in the device prior to interrupting the second time period.

6. The apparatus as described in claim 5 further including program code operative to initiate the privileged operation upon receipt of a privileged command following detecting of remote entry of the key and the code.

7. The apparatus as described in claim 1 further including program code to initiate a system reset upon expiration of the first time period or the second time period.

8. A computer program product in a non-transitory computer readable medium for use in a data processing system, the computer program product holding computer program instructions which, when executed by the data processing system, perform a method to invoke a privileged operation within a network-connected appliance using a privileged command, the network-connected appliance having a normal system reset and a local storage, the computer program instructions comprising:
program code responsive to detecting, during a first time period, of a local action on the appliance, to initiate a second time period and to transition the appliance into a state that overrides the normal system reset and places the network-connected appliance into a safe mode in which invocation of the privileged operation is allowed for remote erasure of the network-connected appliance local storage, wherein the local action is receipt of a button press on the appliance to place the application in the safe mode during which remote erasure of the local storage is permitted remote from the appliance; and
program code responsive to detecting, prior to expiration of the second time period, of an authorized remote request, to initiate the privileged command and enable remote erasure of sensitive data on the network-connected appliance local storage prior to decommissioning the network-connected appliance, the program code response to detecting the authorized remote request including program code to detect remote entry of a key uniquely assigned to a hardware element in the device and program code responsive to detection of the remote entry of the key, to interrupt the second time period to allow initiating the privileged command.

9. The computer program product as described in claim 8 wherein the privileged command is a wipe command to securely erase storage device in the network-connected appliance.

10. The computer program product as described in claim 8 wherein the local action is receipt of the button press on the appliance by a local user to place the application in the safe mode during which remote erasure of the local storage is permitted by another user that is remote from the appliance.

11. The computer program product as described in claim 10 wherein the first time period is initiated upon detecting a system reset command.

12. The computer program product as described in claim 8 further including:
program code to detect remote entry of a code uniquely assigned to a software element in the device prior to interrupting the second time period.

13. The computer program product as described in claim 12 further including program code operative to initiate the privileged operation upon receipt of a privileged command following detecting of remote entry of the key and the code.

14. A method to invoke a privileged operation within a network-connected appliance using a privileged command, comprising:
providing a network-connected appliance having a normal system reset and a local storage
responsive to detecting, during a first time period, of a local action on the appliance, initiating a second time period and transitioning the appliance into a state that overrides the normal system reset and places the network-connected appliance into a safe mode in which invocation of the privileged operation is allowed for remote erasure of the network-connected appliance local storage, wherein the local action is receipt of a button press on the appliance to place the application in the safe mode during which remote erasure of the local storage is permitted remote from the appliance; and
responsive to detecting, prior to expiration of the second time period, of an authorized remote request, initiating the privileged command and enable remote erasure of sensitive data on the network-connected appliance local storage prior to decommissioning the network-connected appliance by detecting remote entry of a key uniquely assigned to a hardware element in the device and interrupting the second time period upon detection of the remote entry of the key to allow initiating the privileged command;
wherein the operations are carried out by software executing in a hardware element in the device.

15. The method as described in claim 14 wherein the privileged command is a wipe command to securely erase storage device in the network-connected appliance.

16. The method as described in claim 14 wherein the local action is receipt of the button press on the appliance by a local user to place the application in the safe mode during which remote erasure of the local storage is permitted by another user that is remote from the appliance.

17. The method as described in claim 14 wherein the first time period is initiated upon detecting a system reset command.

18. The method as described in claim 14 further including initiating a system reset upon expiration of the first time period or the second time period.

* * * * *